Patented Nov. 7, 1922.

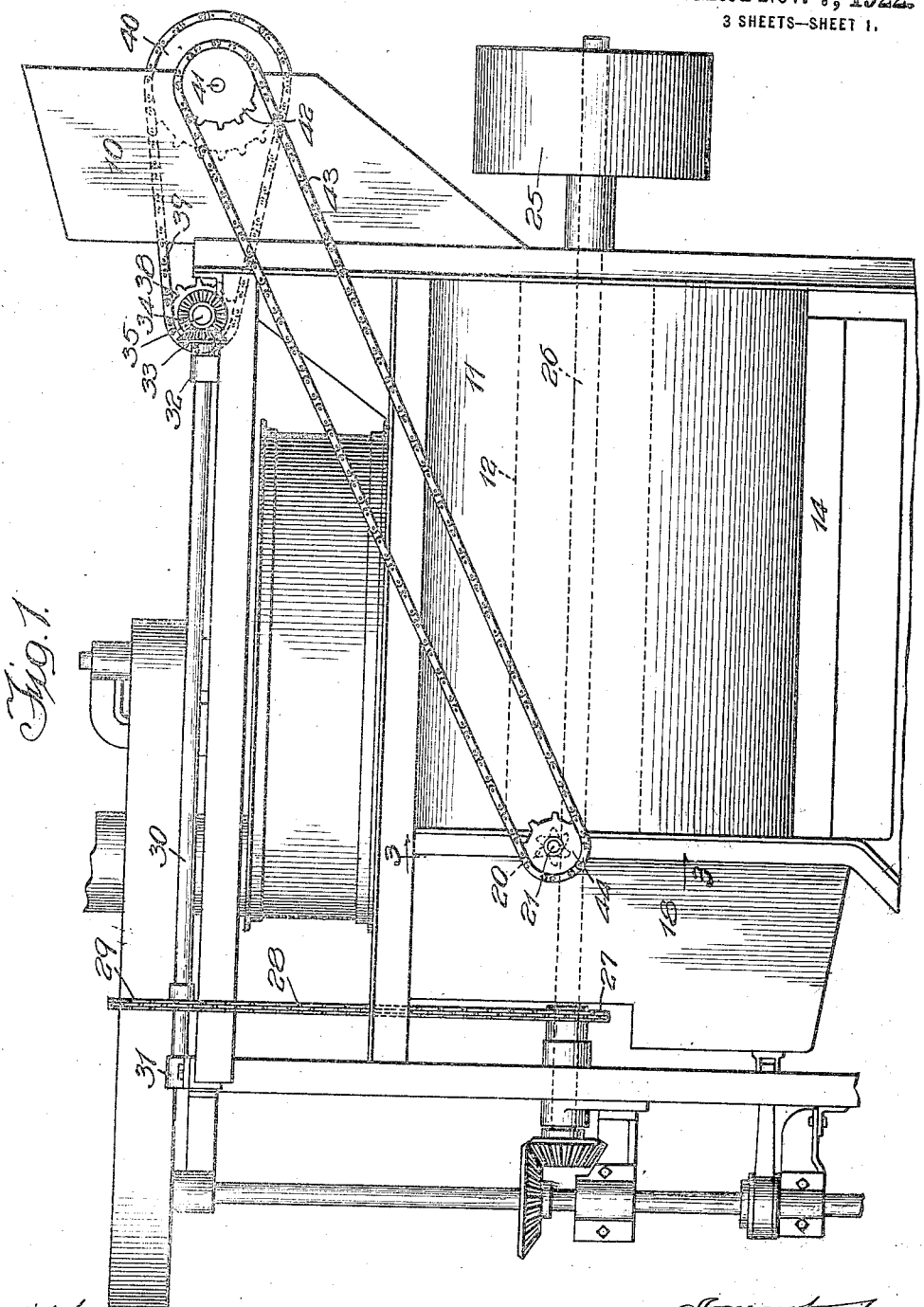

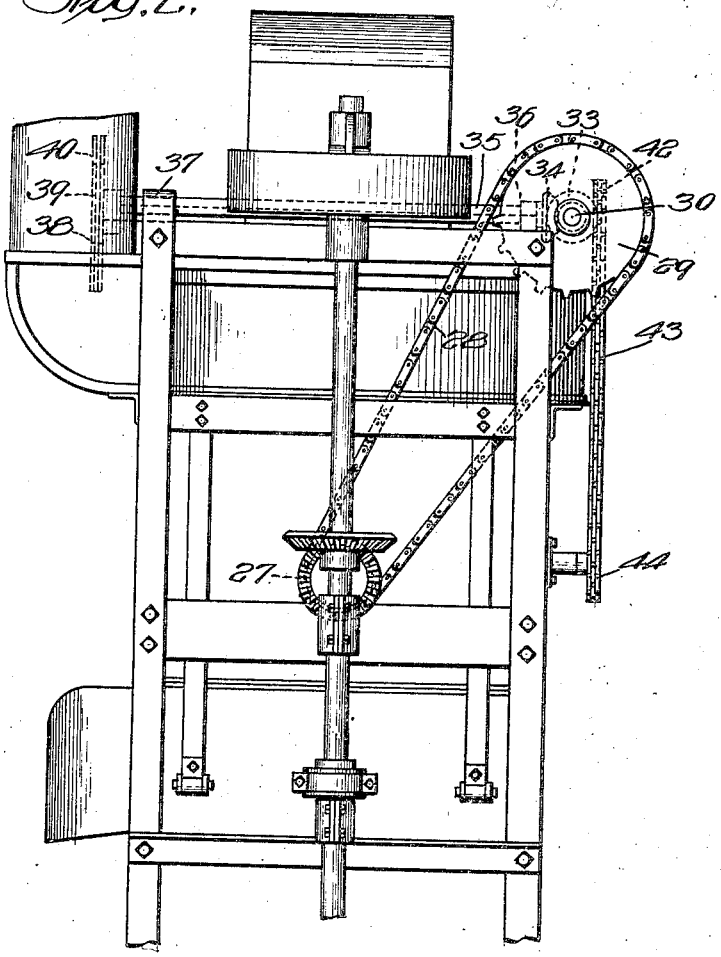

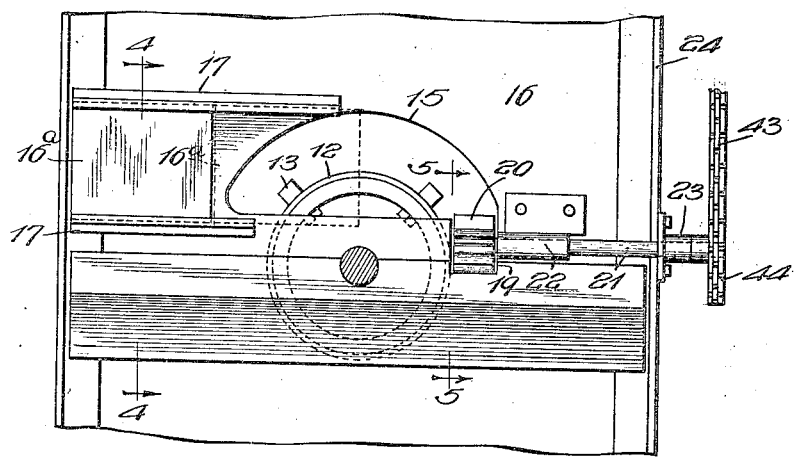
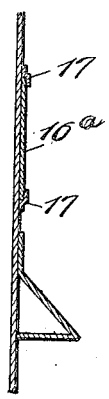
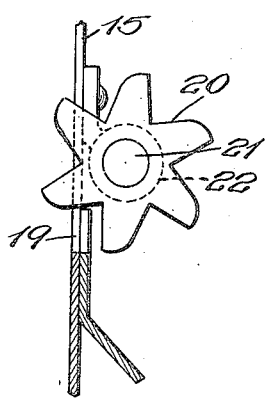

1,434,606

UNITED STATES PATENT OFFICE.

ALBERT E. GILMAN, OF OTTAWA, ILLINOIS, ASSIGNOR TO KING & HAMILTON COMPANY, OF OTTAWA, ILLINOIS, A CORPORATION OF ILLINOIS.

CORN SHELLER.

Application filed May 12, 1921. Serial No. 468,365.

*To all whom it may concern:*

Be it known that I, ALBERT E. GILMAN, a citizen of the United States, and a resident of Ottawa, in the county of La Salle and State of Illinois, have invented certain new and useful Improvements in Corn Shellers, of which the following is a full, clear, and exact specification.

My invention is concerned with corn shellers of the type shown in Letters Patent of the United States, No. 1,322,303, issued November 18, 1919, to myself and John H. Gilman, and involves a novel combination of elements by which I am enabled more surely to feed the cobs and husks, and more especially the husks from the shelling concave and deliver them to the cob riddle.

To this end, I employ in the delivery end of the shelling concave adjacent the end of the discharge aperture toward which the cylinder rotates a wheel or roll extending through the end of the concave and driven by gearing from the power shaft so that it forces out of the concave through the discharge aperture any cobs or husks carried to it by the rotation of the cylinder.

To illustrate my invention, I annex hereto three sheets of drawings in which the same reference characters are used to designate identical parts in all the figures, of which—

Fig. 1 is a side elevation of a portion of a corn sheller embodying my invention;

Fig. 2 is an end elevation of the same;

Fig. 3 is a detail in section on the line 3—3 of Fig. 1; and

Figs. 4 and 5 are sections on the lines 4—4 and 5—5 of Fig. 3; Fig. 5 being on an enlarged scale.

In carrying out my invention, I have shown it as applied to the type of corn sheller shown in the aforesaid application in which the corn is delivered into the hopper 10, from which it passes through an opening in the top of the receiving end of the shelling concave casing 11 into the shelling concave in which rotates the customary shelling cylinder 12, the teeth 13 of which co-operate with the ribs of the shelling concave in the customary manner to separate the corn from the cobs, the shelled corn falling through the bottom of the concave casing on to the shelled corn riddle mechanism 14 in the customary manner. The cobs and any attached husks do not pass through the ribs of the shelling concave, but are carried to the rear of the concave and are delivered through the end thereof by way of the segmental aperture 15 formed in the sheet metal end 16 of the shelling concave casing. The size of this discharge aperture 15 can be regulated in the customary manner by the rectangular slide 16 mounted in the guides 17 in the customary manner. The apparatus so far described may be of any customary construction, such, for instance, as is shown in the aforesaid patent.

In the operation of the apparatus of the aforesaid patent, I found that it not infrequently happened that the husks would get between the end of the cylinder 12 and the adjacent end 16 of the shelling concave, with the result of clogging up and interfering with the delivery of the cobs and husks through the aperture 15 to the cob riddle 18. To remedy this defect, I cut in the end 16 a rectangular extension 19 of the aperture 15, and I journal in this extension the star wheel or roller 20, substantially filling the aperture, the roller being secured upon the shaft 21 journaled in the bearing 22 supported from the end of the casing and in the bearing 23 secured to the angle bar 24 constituting a part of the framework. The shelling cylinder is driven by power applied to the belt wheel 25 secured on the shaft 26 journaled in suitable bearings in the framework. Secured on this shaft 26 is the sprocket wheel 27 which is connected by the sprocket chain 28 with the sprocket wheel 29 secured on the horizontal shaft 30 journaled in suitable bearings 31 and 32 secured on the top of the machine. At the feed end of the sheller the shaft 30 is provided with a miter gear 33 meshing with the miter gear 34 secured on the adjacent end of the horizontal shaft 35 journaled in suitable bearings 36 and 37 secured on the top of the machine. The other end of the shaft 35 has secured thereon the sprocket wheel 38 which is connected by the sprocket chain 39 with the larger sprocket wheel 40 secured on the end of the horizontal transverse shaft 41 which is journaled in suitable bearings supported by the feeding hopper 10. Secured on the other end of the shaft 41 is the sprocket wheel 42 which is connected by the sprocket chain 43 with the sprocket wheel 44 secured on the outer end of the shaft 21. It will of course be understood that this train of gearing from the shaft 26 to the shaft 21 is properly proportioned to rotate the star wheel 20 at a suitable rate of speed so as to carry out over its top any cobs or husks that may be delivered to it by the action of the shelling cylinder 12.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:

1. In a corn sheller, the combination with a shelling concave provided with a delivery aperture through one end thereof, of a shelling cylinder journaled in said concave, gearing for rotating the cylinder, a discharging roller journaled at the end of the concave adjacent the delivery aperture and extending at least partly into the concave, and connections from said gearing for rotating the roller to force out through the aperture material delivered to the roller by the cylinder.

2. In a corn sheller, the combination with a shelling concave provided with a segmental delivery aperture through one end thereof, of a shelling cylinder journaled in said concave, gearing for rotating the cylinder, a discharging roller journaled at the end of the concave beneath the end of the segmental aperture toward which the cylinder rotates and extending at least partly into the concave, and connections from said gearing for rotating the roller to force out through the aperture material delivered thereto by the cylinder.

3. In a corn sheller, the combination with a shelling concave provided with a delivery aperture through one end thereof, of a shelling cylinder journaled in said concave, gearing for rotating the cylinder, a discharging roller journaled in the end of the concave adjacent the delivery aperture and extending at least partly into the concave, and connections from said gearing for rotating the roller to force out through the aperture material delivered to the roller by the cylinder.

4. In a corn sheller, the combination with a shelling concave provided with a segmental delivery aperture through one end thereof, of a shelling cylinder journaled in said concave, gearing for rotating the cylinder, a discharging roller journaled in the end of the concave beneath the end of the segmental aperture toward which the cylinder rotates and extending at least partly into the concave, and connections from said gearing for rotating the roller to force out through the aperture material delivered thereto by the cylinder.

In witness whereof, I have hereunto set my hand and affixed my seal, this fifth day of May, A. D. 1921.

ALBERT E. GILMAN. [L. S.]

Witness:
JOHN HOWARD McELROY.